(12) United States Patent
Nguyen

(10) Patent No.: US 11,424,896 B2
(45) Date of Patent: Aug. 23, 2022

(54) SYSTEM AND METHODS FOR SIGNALS TRANSMISSION IN MULTI-CARRIERS CELL SYSTEM

(71) Applicant: NEC CORPORATION, Tokyo (JP)

(72) Inventor: Phong Nguyen, Victoria (AU)

(73) Assignee: NEC CORPORATION, Tokyo (JP)

( * ) Notice: Subject to any disclaimer, the term of this patent is extended or adjusted under 35 U.S.C. 154(b) by 84 days.

(21) Appl. No.: 16/969,638

(22) PCT Filed: Jul. 13, 2018

(86) PCT No.: PCT/JP2018/026420
§ 371 (c)(1),
(2) Date: Aug. 13, 2020

(87) PCT Pub. No.: WO2019/159390
PCT Pub. Date: Aug. 22, 2019

(65) Prior Publication Data
US 2020/0403761 A1 Dec. 24, 2020

(30) Foreign Application Priority Data

Feb. 14, 2018 (AU) .................................. 2018900461

(51) Int. Cl.
*H04L 5/00* (2006.01)
*H04W 72/04* (2009.01)

(52) U.S. Cl.
CPC ............ *H04L 5/0094* (2013.01); *H04L 5/001* (2013.01); *H04W 72/042* (2013.01); *H04W 72/0453* (2013.01); *H04W 72/04* (2013.01)

(58) Field of Classification Search
CPC .... H04L 5/001; H04L 5/0094; H04W 72/042; H04W 72/0453
See application file for complete search history.

(56) References Cited

U.S. PATENT DOCUMENTS

2011/0281615 A1\* 11/2011 Yamada ................ H04W 24/10
455/524
2015/0282100 A1\* 10/2015 Lee ...................... H04W 52/245
370/329

(Continued)

FOREIGN PATENT DOCUMENTS

JP 2015-073209 A 4/2015

OTHER PUBLICATIONS

"IMT Vision—Framework and overall objectives of the future development of IMT for 2020 and beyond", Recommendation Itu-R M.2083-0, (Sep. 2015), 21 pages.

(Continued)

*Primary Examiner* — Kevin C. Harper
(74) *Attorney, Agent, or Firm* — Sughrue Mion, PLLC

(57) ABSTRACT

A method for use in a scalable New Radio (NR) cell system comprises, at a gNB: configuring a physical transmission and reception point (TRP) in a New Radio (NR) cell as a high power gNB's distribution unit (DU) operating on a first component carrier (CC) layer; configuring the remaining physical TRPs in the NR cell as low power gNB's DUs operating on one or multiple second CC layers; further configuring the carrier bandwidths on the first CC layer and second CC layers to comprise multiple bandwidth parts (BWPs); via high layer signaling, configuring one or more advanced UEs in services or requesting services with a set of indexed BWPs and a configurable "initial BWP" for active BWP switching operation; and via high layer signaling, configuring one or more advanced UEs in services or requesting services with two or more sets of indexed BWPs for active BWPs aggregation operation.

17 Claims, 11 Drawing Sheets

(56) References Cited

U.S. PATENT DOCUMENTS

| | | | | |
|---|---|---|---|---|
| 2017/0332335 | A1* | 11/2017 | Au | H04W 52/50 |
| 2018/0332541 | A1* | 11/2018 | Liu | H04W 52/241 |
| 2019/0053103 | A1* | 2/2019 | Manolakos | H04L 5/0048 |
| 2019/0222290 | A1* | 7/2019 | Ly | H04B 7/0695 |
| 2020/0280987 | A1* | 9/2020 | Liu | H04W 72/042 |
| 2020/0337027 | A1* | 10/2020 | Lee | H04W 72/042 |
| 2021/0076445 | A1* | 3/2021 | Tsai | H04W 76/19 |
| 2021/0091914 | A1* | 3/2021 | Xue | H04L 5/0098 |
| 2021/0288879 | A1* | 9/2021 | Yao | H04L 41/0816 |

OTHER PUBLICATIONS

3rd Generation Partnership Project; Technical Specification Group Services and System Aspects Feasibility Study on New Services and Markets Technology Enablers; Stage 1 (Release 14), 3GPP TR 22.891 V14.0.0, (Mar. 2016), 95 pages.
"3rd Generation Partnership Project; Technical Specification Group Services and System Aspects; Study on Architecture for Next Generation System (Release 14)", 3GPP TR 23.799 v0.5.0 (May 2016), 178 pages.
"3rd Generation Partnership Project; Technical Specification Group Radio Access Network; Study on New Radio Access Technology (Release 14)", TR 38.802 V14.2.0 (Sep. 2017), 145 pages.
"3rd Generation Partnership Project; Technical Specification Group Radio Access Network; Study on Scenarios and Requirements for Next Generation Access Technologies (Release 14)", 3GPP TR 38.913 V14.3.0 (Jun. 2017), 39 pages.
"3rd Generation Partnership Project; Technical Specification Group Radio Access Network; Study on New Radio Access Technology; Radio access architecture and interfaces (Release 14)", 3GPP TR 38.801 V14.0.0 (Mar. 2017), 91 pages.
"3rd Generation Partnership Project; Technical Specification Group Radio Access Network; NR; Physical Channels and modulation (Release15)", 3GPP TS 38.211 v15.0.0 (Dec. 2017), 73 pages.
"3rd Generation Partnership Project; Technical Specification Group Radio Access Network; NR Multiplexing and channel coding (Release 15)", 3GPP TS 38.212 v15.0.0 (Dec. 2017), 82 pages.
"3rd Generation Partnership Project; Technical Specification Group Radio Access Network; NR; Physical Tayer procedures for control (Release 15)", 3GPP TS 38.213 v15.0.0 (Dec. 2017), 56 pages.
3rd Generation Partnership Project; Technical Specification Group Radio Access Network; NR; Medium Access Control (MAC) protocol specification (Release 15), 3GPP TS 38.321 V15.0.0 (Dec. 2017), 55 pages.
"5G End-to-End Architecture Framework", NGMN Alliance, 3GPP Draft NGMN_E2EARCHFRAMEWORK_V0.8.1, 3rd Generation Partnership Project (3GPP), Mobile Competence Centre ; 650, Route Des Lucioles ; F-06921 Sophia-Antipolis Cedex ; FRANCE, Dec. 17, 2017, XP051366722, 36 pages.
Huawei et al., "Remaining issues on bandwidth part", 3GPP TSG RAN WG1 Meeting #91, R1-1719380, Nov. 27-Dec. 1, 2017, 10 pages.
Huawei et al., "Remaining issues on bandwidth part and wideband operation", 3GPP TSG RAN WG1 NR Ad Hoc Meeting, R1-1800018, Jan. 22-26, 2018, 14 pages.
Written Opinion for PCT/JP2018/026420, dated Oct. 17, 2018.
International Search Report for PCT/JP2018/026420, dated Oct. 17, 2018.
Japanese Office Communication for JP Application No. 2020-540649 dated Sep. 21, 2021 with English Translation.
Catt, "Si info transmission on f1 interface", 3GPP TSG RAN WG2#100, R2-1712418, Dec. 1, 2017.
LG Electronics, "Remaining issues on bandwidth part operation", 3GPP TSG RAN WG1 adhoc_NR_AH_1801, R1-1800384, Jan. 26, 2018, Canada.
LG Electronics Inc., "PHR for wider bandwidth operation", 3GPP TSG RAN2 WG2 #99, R2-1709064, Aug. 25, 2017, Germany.

* cited by examiner

UE's configured BWP index : (CC's configured BWP index , CC index)

SYSTEM AND METHODS FOR SIGNALS TRANSMISSION IN MULTI-CARRIERS CELL SYSTEM

CROSS REFERENCE TO RELATED APPLICATIONS

This application is a National Stage of International Application No. PCT/JP2018/026420 filed Jul. 13, 2018, claiming priority based on Australia Patent Application No. 2018900461 filed Feb. 14, 2018, the disclosure of which is incorporated herein in its entirety by reference.

TECHNICAL FIELD

The present invention relates generally to a next generation or 5G wireless communication system. More specifically, it relates to the system, methods and devices for use in realising intra/inter-carriers bandwidth/numerology adaptation, intra/inter carriers or inter-frequency load balancing, zero latency handover utilising bandwidth part (BWP) operation including BWP switching and/or BWPs aggregation.

BACKGROUND ART munication; attentions are now on the development of 5th generation (5G) technology and services. Although the design and deployment of any wireless system or cellular system takes many years, the development of the 5G technology systems has been investigated progressively in 3GPP standardisation community. With the target for commercial deployment of 5G system being initially planned for 2020 and lately being brought forward to 2018, work has started in International Telecommunication Union (ITU) and in third generation partnership project (3GPP) to perform feasibilities study for technological specifications development and to develop requirements for new radio (NR) systems as in ITU-R's "Framework and overall objectives of the future development of IMT for 2020 and beyond" [NPL 1], in 3GPP SA1's "New Services and Markets Technology Enablers (SMARTER)" study item [NPL 2] and in 3GPP SA2's "Architecture for NR System" study item [NPL 3].

According to 3GPP RAN and particularly 3GPP-RAN-WG1 (i.e. radio working group), the NR or 5G system will be implemented for deployment in frequency bands ranging from UHF (Ultra-high frequency), SHF (Super-high frequency) to EHF (Extremely-high frequency) from below 3 GHz frequency bands to 52.6 GHz frequency bands. In order to reduce propagation loss of radio waves and increase transmission distance in transmitting and receiving radio

ABBREVIATIONS

| | |
|---|---|
| 3GPP | 3rd Generation Partnership Project |
| 4G | 4th generation |
| 5G | 5th generation |
| DL | Downlink |
| gNB | Logical Access node handling transmission/reception in multiple TRPs in a NR system. Commonly, corresponding to NR-base station |
| ID | Identity |
| ITU | International Telecommunication Union |
| LTE | Long term evolution |
| LTE-A | Advanced LTE or 4G |
| LTE-A Pro | LTE Advanced Pro. 3GPP LTE Release 13 and 14; In layman's term it may be called 4.5G, 4.5G Pro, 4.9G |
| MAC-CE | MAC Control Entity |
| NR | New Radio |
| N-RAT | New RAT |
| NR-UE or UE | User equipment with new radio capability |
| OFDM | Orthogonal Frequency-division multiplexing |
| RAN | Radio Access network |
| RAN-WG1 or RAN1 | Radio Access Network - Working Group 1 or Radio layer 1 working group |
| RAT | Radio Access technology |
| SCS | Sub Carrier Spacing |
| TTI | Transmission Time Interval |
| UL | Uplink |
| Beam determination | for TRP(s) or UE to select of its own Tx/Rx beam(s). |
| Beam measurement | for TRP(s) or UE to measure characteristics of received beamformed signals |
| Beam reporting | for UE to report information of beamformed signal(s) based on beam measurement |
| Beam sweeping | operation of covering a spatial area, with beams transmitted and/or received during a time interval in a predetermined way |
| SHF | Super-high frequency (3 GHz-30 GHz) |
| UHF | Ultra-high frequency (300 MHz-3 GHz) |
| EHF | Extremely-high frequency (30 GHz-300 GHz) |

The reference to any prior art in this specification is not, and should not be taken as an acknowledgement or any form of suggestion that the prior art forms part of the common general knowledge.

With the 4th generation (4G) telecommunications systems have been successfully deployed at accelerating pace all over the world which enables more and more advanced services and applications making use of the inherent benefit of LTE/LTE-A/LTE-A Pro technologies, such as higher data rate, lower latency, enhanced coverage, and sidelink comsignals in SHF and EHF bands, several technologies including beamforming and beam sweeping techniques have been investigated, endorsed or adopted for use in NR system by 3GPP-RAN. Beam sweeping is regarded as operation of covering a spatial area, with beams transmitted and/or received during a time interval in a predetermined way, and one or multiple user equipment (UEs) in a NR cell may be serviced by one or more designated indexed narrow (DL or UL) beam/beams. In NR's system, a typical single cell (e.g. 02—FIG. 1) may comprise multiple TRPs (transmission/ reception points) that provides the desired coverage by beam sweeping and wireless connectivity service by beamforming to in-coverage UEs [NPL 6], where a UE does not have knowledge of the TRP(s) that is(are) providing beam forming (DL/UL) services. Additionally, Bandwidth Part (BWP) is also introduced as new feature in the incoming 3GPP Rel'15, primarily enabling the reduced UE bandwidth capability within a wideband carrier, and the reduced UE power energy consumption by bandwidth adaptation. In reference to FIG. 2 illustrating exemplary BWP feature agreed for Rel'15, a Rel'15 NR carrier bandwidth comprises non-overlapping and/or overlapping carrier BWPs (e.g. 03—FIG. 2). The configured BWPs within a carrier BW may have the same numerology and/or different numerologies. A UE configured for operation in bandwidth parts (BWPs) of a serving cell, is configured by higher layers for the serving cell with a set of at most four bandwidth parts (BWPs) for signals receptions by the UE (DL BWP set) in a DL bandwidth and a set of at most four BWPs for signals transmissions by the UE (UL BWP set) in an UL bandwidth for the serving cell (e.g. 04—FIG. 2). For unpaired spectrum operation, a DL BWP from the set of configured DL BWPs is linked to an UL BWP from the set of configured UL BWPs. For unpaired spectrum operation, a UE can expect that the centre frequency for a DL BWP is same as the centre frequency for a UL BWP. In Rel'15, UE in a serving cell is configured with a single downlink and uplink carrier bandwidth part being active at a given time. A Rel'15 UE may be instructed by its serving gNB to switch from current activated BWP (DL or UL) to another activated BWP through scheduling/grant DCI or MAC-CE messages (e.g. 05—FIG. 2). Furthermore, timer based active switching is introduced allowing a UE to switch to the configured default or initial DL and/or UL BWP from an activated DL and/or UL BWP when the configured timer expires.

It is noticed that the 3GPP Rel'15 NR BWP operation is limited to BWP switching among the configured BWPs within a UE's configured BWP set where the UE's configured BWPs in a configured BWP set are desired to be within the UE's maximum channel BW, and UE's maximum channel BW and carrier BW of its serving cell may be the same.

Looking beyond Rel'15 NR, it the Applicant has foreseen that NR's carrier BW shall be super wide band especially in SHF and EHF bands, which may be several times wider than a possible UE's maximum channel BW and a UE's maximum channel BW shall vary according to defined UE's categories or capability. Furthermore, the Applicant has foreseen that NR's cell may be virtualised with configurable cloud radio interface comprising several layers of component carriers from the same and/or different frequency bands that shall require an evolution of BWP operation.

CITATION LIST

Non Patent Literature

NPL 1: ITU-R M.2083-0 (09/2015)—IMT Vision—Framework and overall objectives of the future development of IMT for 2020 and beyond
NPL 2: TR 22.891 v14.0.0 (2016-03)—Feasibility Study on New Services and Markets Technology Enablers
NPL 3: TR 23.799 v0.5.0 (2016-05)—Study on Architecture for Next Generation System
NPL 4: TR 38.802—Study on NR New Radio Access Technology (Release 14)
NPL 5: TR 38.913—Study on Scenarios and Requirements for Next Generation Access Technologies (Release 14)
NPL 6: TR 38.801—Study on NR New Radio Access Technology (Release 14)
NPL 7: TS 38.211 v15.0.0 (2017-12)—Physical Channels and modulation (Release 15)
NPL 8: TS 38.212 v15.0.0 (2017-12)—Multiplexing and channel coding (Release 15)
NPL 9: TS 38.213 v15.0.0 (2017-12)—Physical layer procedures (Release 15)
NPL 10: TS 38.321 v15.0.0 (2017-12)—Medium Access Control (MAC) protocol specification (Release 15)

SUMMARY OF INVENTION

According to one aspect of the present invention, there is provided a method for use in a scalable New Radio (NR) cell system, the system comprising a single gNB and multiple associated transmission and reception points (TRPs) defining an NR cell having cloud radio interface coverage on multiple layers of component carriers (CCs), the system further comprising a plurality of in-coverage advanced UEs together configured for bandwidth parts (BWPs) operation, the method comprising:

at the gNB, configuring a physical TRP in the NR cell as a high power gNB's distribution unit (DU) operating on a first CC layer;

at the gNB, configuring the remaining physical TRPs in the NR cell as low power gNB's DUs operating on one or multiple second CC layers;

at the gNB, further configuring the carrier bandwidths on the first CC layer and second CC layers to comprise multiple BWPs;

at the gNB, via high layer signaling, configuring one or more advanced UEs in services or requesting services with a set of indexed BWPs and a configurable "initial BWP" for active BWP switching operation; and at the gNB, via high layer signaling, configuring one or more advanced UEs in services or requesting services with two or more sets of indexed BWPs for active BWPs aggregation operation.

The preferred embodiment of the present invention is directed to system, methods and devices for use in an advanced wireless communication system, such as the fifth generation (5G) or New Radio (NR) in realising intra/inter-carriers bandwidth adaptation, intra/inter carriers or inter-frequency load balancing, zero latency handover utilising bandwidth part (BWP) switching and/or bandwidth parts aggregation, which may at least partially overcome at least one of the disadvantages, or fulfil at least one of the requirement identified or discussed in the background section, or provide the consumer with a useful or commercial choice.

In one broad form, the preferred embodiment of the present invention is related to the scalable NR cell structure comprising a logical node gNB configuring and coordinating plurality of associated physical transmission/reception points (TRPs) in performing radio related functions for signals transmission and reception concurrently on multiple layers of carriers in frequency bands ranging from UHF, to SHF and EHF.

According to one embodiment of the present invention, for BWP switching operation in the aforementioned NR cell structure, an advanced UE can be configured by its servicing gNB to have at most one set of indexed BWPs. The BWPs, within a set configured for BWP switching operation at an advanced UE are the indexed carrier BWPs. These indexed carrier BWPs belong to one carrier or multiple carriers that form cloud radio interface of the NR cell. Furthermore, the BWPs in a set configured for BWP switching operation at an advanced UE are indexed basing on the combination of configured carrier BWP index and the belonged carrier index. The UE's BWP indexes are used as reference by the UE and its servicing gNB for BWP switching indication. The gNB may further select an indexed BWP in a configured set as the "initial BWP", and indicate "initial BWP" index to the serviced UE. Servicing gNB may adaptively reconfigure the "initial BWP" at a UE and may further use DCI or MAC-CE message to indicate the change in "initial BWP" configuration. Plurality of advanced UEs in a NR cell sharing an identical set of indexed BWPs may have the same or different configures/reconfigured "initial BWP".

According to another embodiment of the present invention, for BWP aggregation operation, an advanced UE can be configured by its servicing gNB to have at least two sets of indexed BWPs comprising a primary set and multiple secondary sets. Activating a secondary set or an indexed BWP within a secondary set may enabling BWP aggregation.

According to other embodiment of the present invention, a servicing gNB can adaptively reconfigure the configured set of indexed BWPs for BWP operation at a serviced UE, where the reconfiguration may appear in the form of removing an existing configured BWP from the set, or adding a new configured BWP to the set, or replacing an existing configured BWP in the set with a new configured BWP.

According to further embodiment of the present invention, when configuring a set of indexed BWPs for BWP operation at an advanced UE comprising two or more indexed BWPs that are not reside within the UE maximum channel BW, the servicing gNB further configure the serviced UE with periodic measurement gaps for RRM/CSI measurement. In the configured measurement gap, the advanced UE is required to retune the centre frequencies to one or more configured BWPs and to perform RRM/CSI measurement. Upon returning to its currently active BWP or initial BWP, the advanced UE transmits the measurement reports to the servicing gNB preferably on the pre-scheduled UL channels, where the measurement report will assist the active BWP switching decision making at the servicing gNB.

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
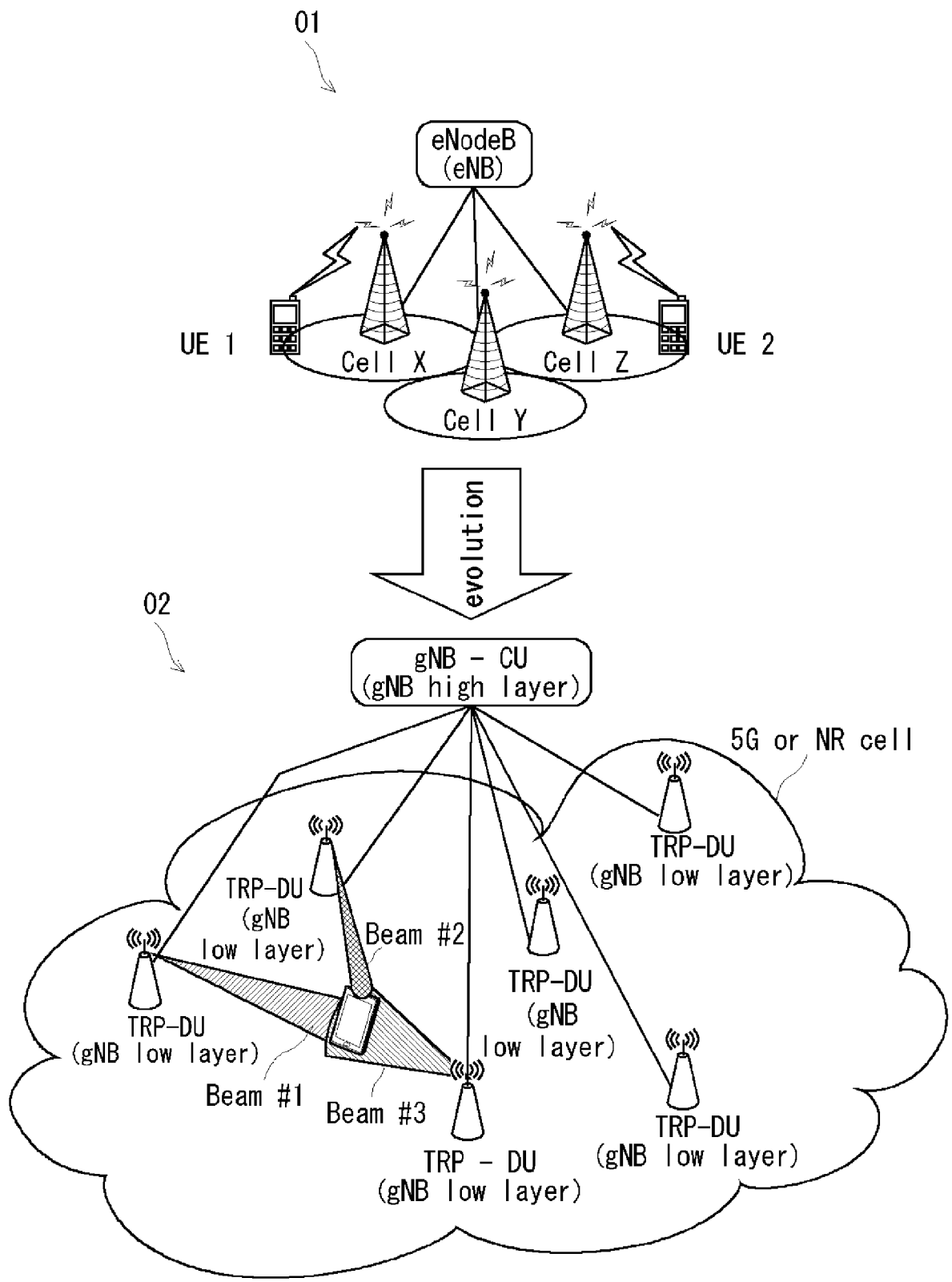
FIG. 1 is Single Cell system according to the related arts i.e. LTE and NR-5G.
Figure 2:
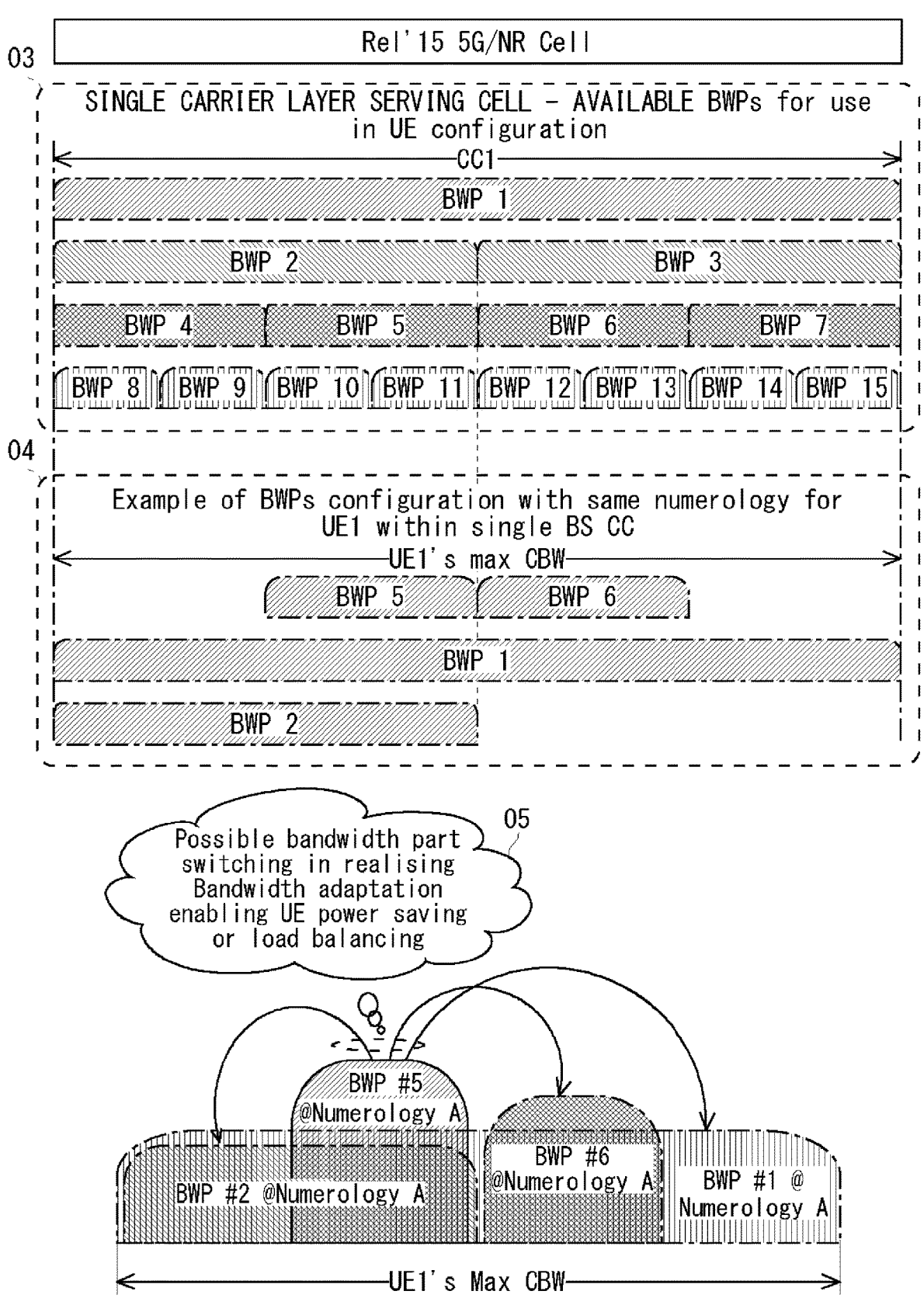
FIG. 2 is Exemplary BWP part configuration according to the related art—Rel'15 NR.

FIG. 1 schematically illustrates a LTE cell structure (01) and NR's cell structure (02) according to the related arts.

According to LTE technology, one or several cells is/are controlled/managed by a logical node i.e. eNB which is responsible for all radio related functions (01). In LTE system, a LTE UE searches, identifies and selects LTE's cell and directly communicates through the identifiable cell's access point. Moving from one cell's coverage to another cell's coverage, which may belong to same or different eNB, will trigger cell reselection procedure (i.e. if UE is in RRC_IDLE mode) or handover procedure (i.e. if UE is in RRC_CONNECTED mode) at the UE. Even though it is not shown in the FIG. 1 (01), LTE-A also supports Hetnet techniques where low power micro cells can be nested within a high power macro cell operating in the same channel or different channel and utilising features such as carrier aggregation and coordinated multipoint to maximize spectrum efficiency per unit area, provide higher network capacity and enhanced user experience.

According to currently developed NR technology, an NR cell (02) has been revolutionised to comprise one or multiple transmission-reception-points (TRPs) as gNB's physical distributed units (DUs) which belong to one identifiable gNB's central unit (CU) as logical node i.e. gNB. Beam sweeping technique is employed where beams transmitted and/or received from/at one or multiple TRPs within a NR's cell during a time interval in a predetermined way to achieve the desired coverage for initial access. For UE-specific dedicated data transmission/reception service, DL beamforming and/or UL beamforming technique are used at servicing TRPs and serviced UEs in transmitting/receiving signals using adaptive beamforming. Moving within an NR cell serviced by multiple TRPs may trigger beam selection and/or beam reselection procedure at a UE. In an NR cell defined by multiple TRPs, a UE does not have knowledge of the TRP that transmits beam-formed signals to it or the TRPs that receives its transmitted signal (beam-formed or non-beam-formed). DL beamforming from one or multiple coordinated fixed TRPs serving a UE is practically achievable as UE's position can be physically tracked for narrowly beam-formed signal transmission. However, UL beam forming may be difficult and impractical to achieve due to UE random orientation, and the UE does not have knowledge of the physical TRPs with which it communicates. DL beam-formed signal to a UE may come from one TRP or several coordinated TRPs in an NR cell, where UL beam-formed or non-beam-formed signal from the UE may be able to reach and/or be received by other TRP(s). The proposed NR cell structure with multiple layers of component carriers and BWP evolution that are discussed in the subsequent paragraphs will not only resolve the aforementioned UL beamforming difficulty but also provide a mechanism for flexibly increasing cell capacity as well as opening a new dimension for defining cellular mobile networks.

Figure 3:
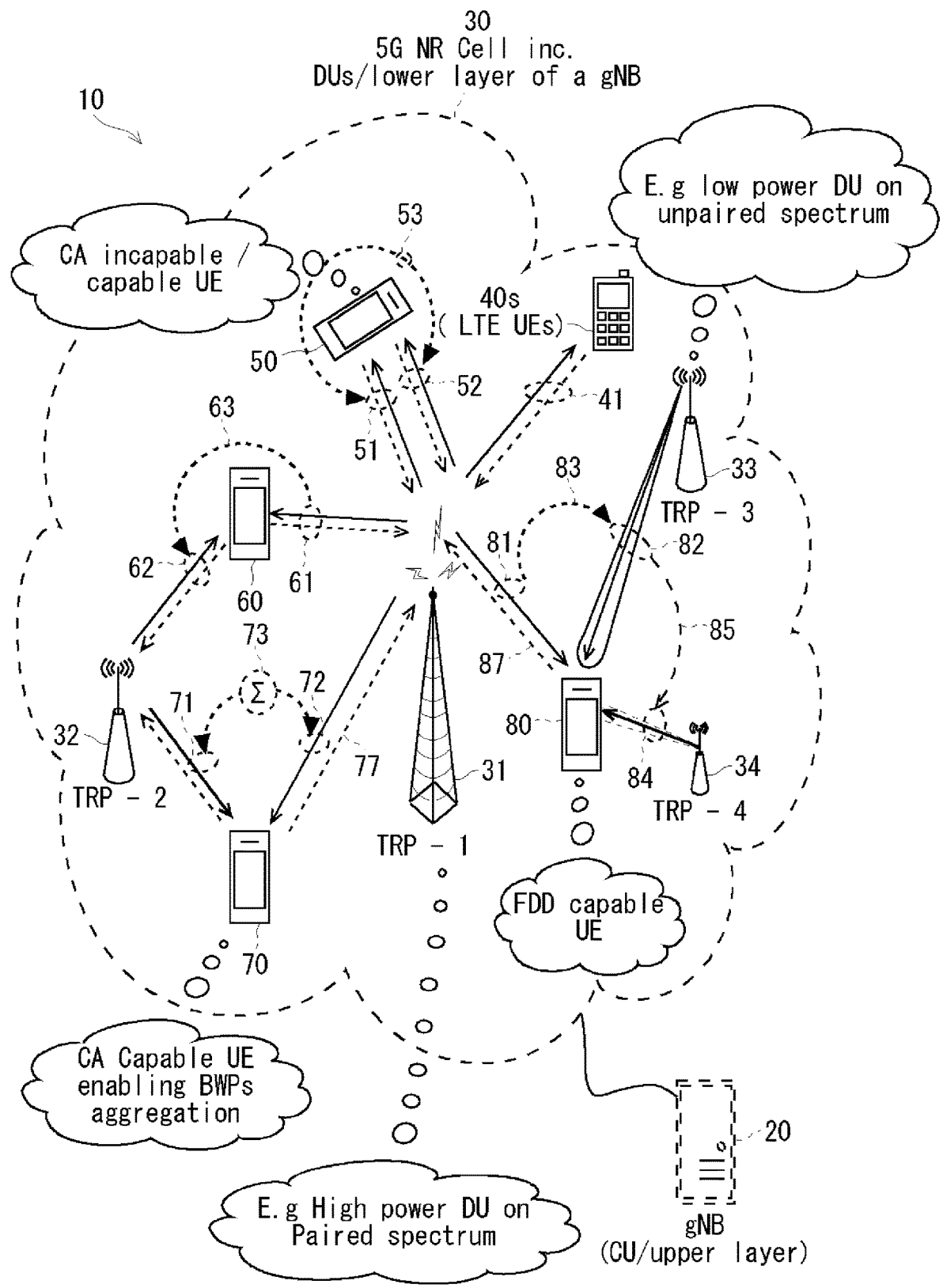
FIG. 3 is Advanced wireless communication system and method for realising bandwidth part configuration and switching in multi-layer CCs cell in accordance with an embodiment of the present invention.

In reference to FIG. 3, that exemplarily illustrates the proposed scalable wireless communication system, a method is provided for configuring and operating BWP in multiple layers of component carriers (CCs) and associated apparatus in which the exemplary embodiment of the invention will be analysed, discussed or practiced to advance. The wireless communication system (10) is considered as the revolutionised NR single cell for use in the future 5G network comprising of an logical node (20) representing a gNB's CU (central unit) and multiple associated physical TRPs (31, 32, 33, and 34) representing the gNB's DUs (distributed units). The gNB's CU is responsible for high layer of radio related functions, where the associated TRPs (31, 32, 33, and 34) are responsible for low layers of radio related functions. A gNB (20) and its associated TRPs (31, 32, 33, and 34) provide cloud radio interface with desirable coverage (30), and beams-sweeping and beamforming wireless connectivity services to plurality of user equipment (UEs) including LTE UE (40) and advanced UEs (50, 60, 70, and 80). The advanced UEs (e.g. 50, 60, 70, and 80) are capable of BWP (bandwidth part) operation. Among the said plurality of advanced UEs, one or more UEs such as UE (70) are equipped with more than one RF chain and hence are capable of performing carrier aggregation (CA). According to the method that is disclosed, those UEs can be configured to realise BWPs aggregation. In one embodiment of the present invention, among the plurality of TRPs forming a NR cell coverage (e.g. 30) and sharing the same identifiable cell-ID, there may be at least one TRP as high power DU (e.g. 31) being configured for signal transmission and reception on the first layer CC. It may be preferable that the high power TRP is operating on paired spectrum within UHF band to have wide coverage catering for high mobility UEs and legacy LTE UE. The remaining TRPs (e.g. 32, 33, and 34) may be low power DUs that may be densely deployed. The low power TRPs may be configured for signal transmission and reception on other layers of CCs (e.g. second layer CCs, third layer CCs etc.) on paired and/or unpaired spectrum within UHF band or preferably within SHF and/or EHF band to gain super-wideband bandwidth available for use. The carrier BWs on all layers of CCs are further configured to comprise one or multiple BWPs for further UE's configuration.

Figure 4:
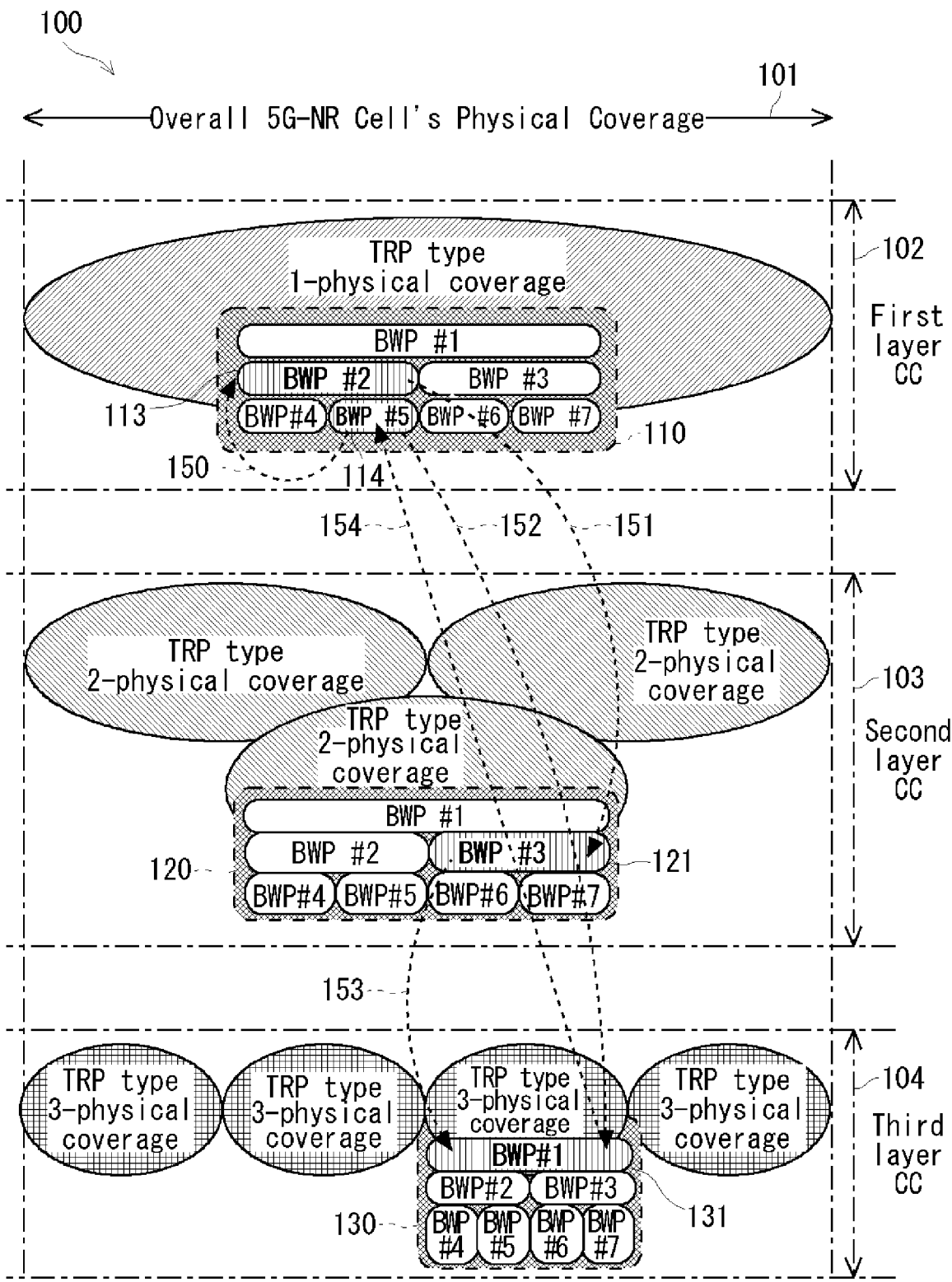
FIG. 4 is Method of BWP configuration in realising BWP switching and BWP aggregation in a multi-layer CCs cell system.

The concept of aforementioned BWP configuration in multi-layer CCs cell is further exemplified in FIG. 4. In reference to FIG. 4, a 5G-NR cell may be formed from one type-1 TRP, plurality of type-2 TRPs, and plurality of type-3 TRPs providing overall designed cell coverage (101). The type-1 TRP is configured for signal transmission and reception on the first layer CC (102), where the type-2 TRPs and type-3 TRPs are configured for signal transmission and reception on the second layer CC (103) and third layer CC (104) respectively. Type-1 TRP's carrier BW is configured to comprise seven indexed BWPs (110; e.g. BWP #1, 2, 3, 4, 5, 6, and 7). Where Type-2 TRPs' carrier BW and Type-3 TRPs' carrier BW are configured to comprise other seven indexed BWPs (120—e.g. BWP #1, 2, 3, 4, 5, 6, and 7) and (130—e.g. BWP #1, 2, 3, 4, 5, 6, and 7) respectively. In reference to related FIG. 5, a carrier bandwidth (e.g. 111—FIG. 5) in a NR system can be wider than a UE's maximum channel BW (e.g. UE 2—161 and UE 3—162—FIG. 5) as being illustrated in example 110—FIG. 5. While the BW of a configured carrier BWP (e.g. 112) may be smaller or equal to UE's maximum channel BW (e.g. 160, 161, or 162). In reference to FIG. 4, an advanced UE can be configured with a set of multiple carrier BWPs where the all configured BWPs may be within one configured layer CC (e.g. 113 and 114 from 102) or from across several configured layer CCs in a NR cell (e.g. 113, 115, 121, 131 from 102, 102 and 104). A set of configured BWPs being configured for use at an advanced UE can be reconfigured by the servicing gNB by removing an existing indexed BWP configuration, or adding a new indexed BWP configuration, or removing and adding an indexed BWP configuration. The advanced UE can be further configured with an 'initial BWP' (e.g. 114 from 102), which is selected among the set of configured BWPs. While being in the active mode for signals reception and/or transmission, the advanced UE may be instructed by its servicing gNB to switch from a currently activated BWP to another activated BWP. Where the current activated BWP and next activated BWP may be within the same CC (e.g. 150), or on different CCs (e.g. 151, 152, 153, or 154) depending on a UE position in an NR cell, service on demand, QoS on demand, resource availability etc.

Figures 5, 6:
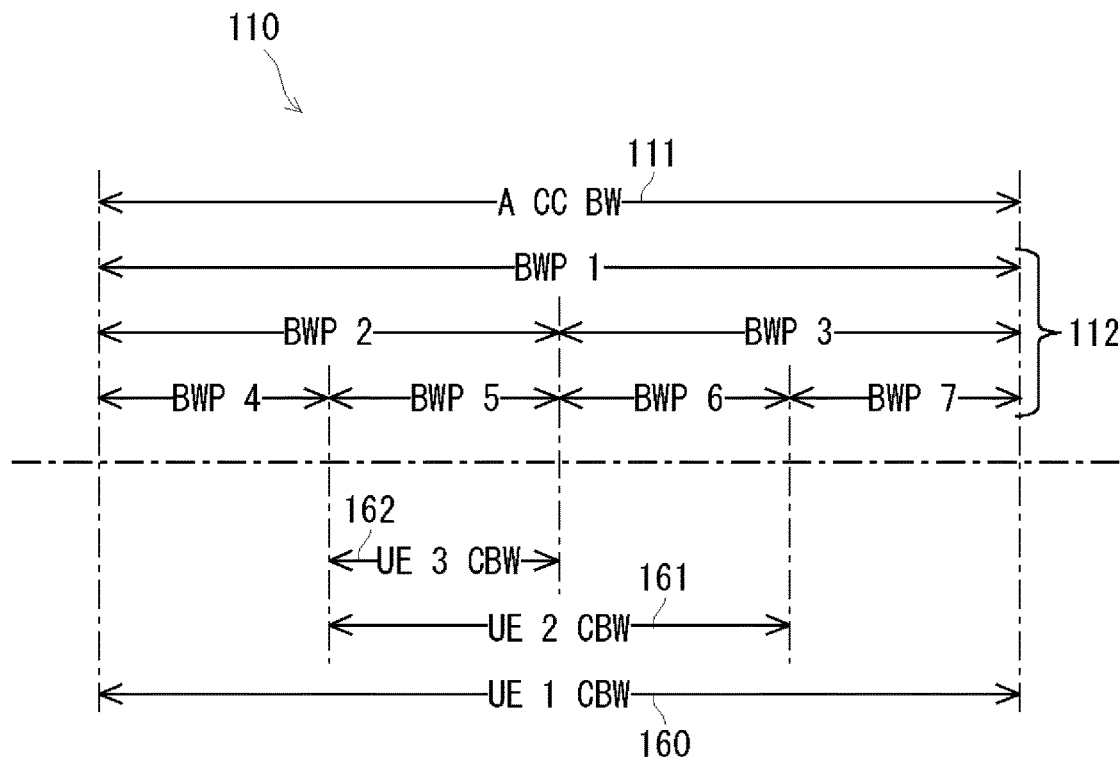
FIG. 5 is Carrier BW—UE's Channel BW—BWP definitions and relationship accordance with an embodiment of the present invention.
FIG. 6 is BWP indexing accordance with an embodiment of the disclosed invention.
Figure 7:
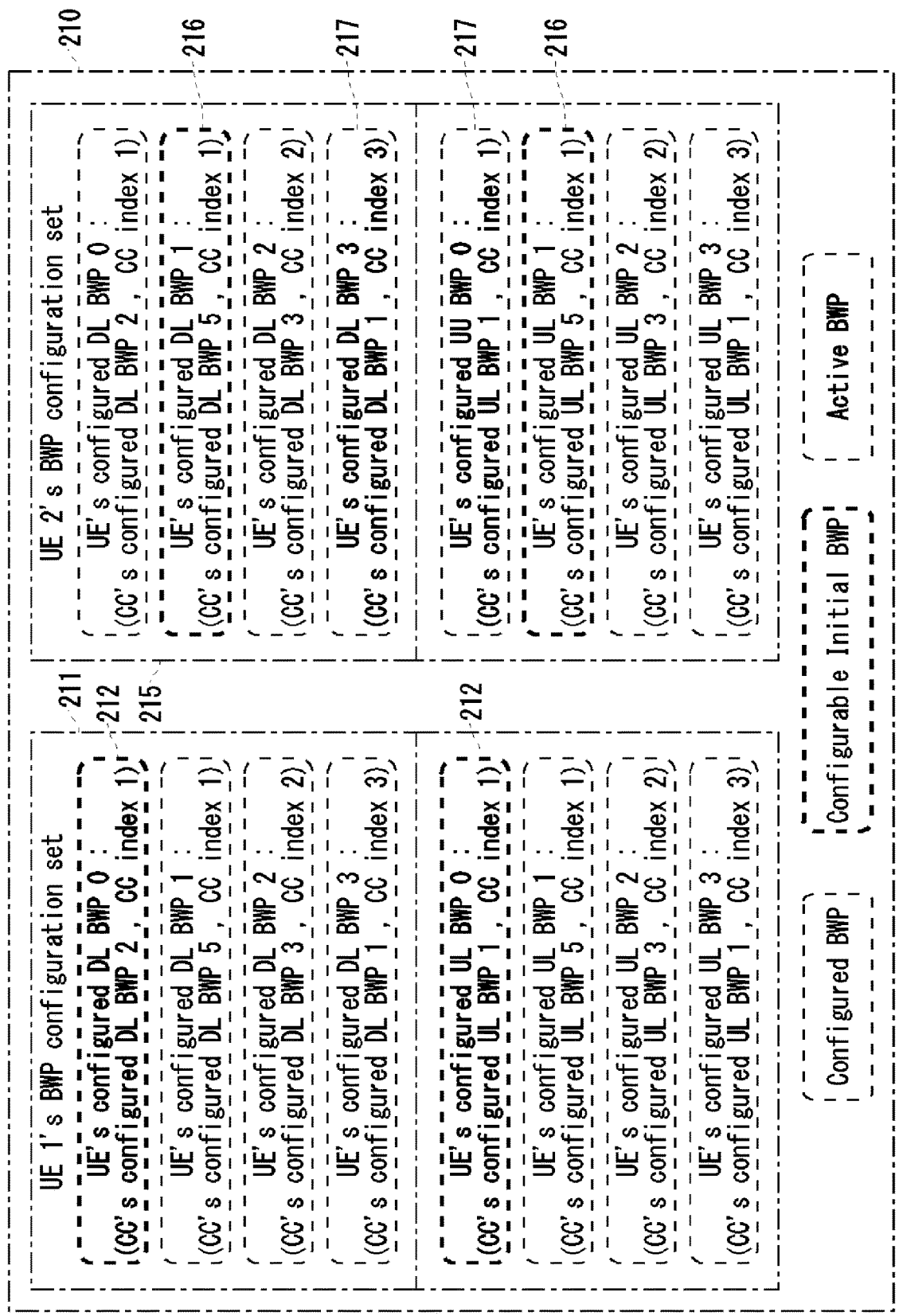
FIG. 7 is Exemplary BWP configuration set for realising BWP switching accordance with an embodiment of the disclosed invention.

According to the present embodiment, and referring to message structure 200—FIG. 6 for illustration, in realising BWP configuration for BWP switching in the above described multi layers of CCs cell structure, a UE's configured BWP index (201) is defined as the combination of a configured BWP index (202) and the CC index (203) that the configured BWP belongs to. With configurable 'initial BWP', a plurality of advanced UEs sharing an identical set of configured BWPs can be configured with different 'initial BWP index' for use. For example, UE 1 in FIG. 7 may be configured with the set of BWPs (211), which is the same as the set of BWPs (215) being configured for use by UE 2. However, UE 1 may be configured with DL BWP0 & UL BWP0 as the initial BWP indexes (212) which are also the UE1's currently activated BWP indexes for signals reception and transmission. Where UE2 is configured with DL BWP1 & UL BWP1 as the initial BWP index (216) and DL BWP 3 & UL BWP 0 as UE2's currently activated BWP indexes for signals reception and transmission. Advanced UEs in the same cell having different configured 'initial BWP' may enable the gNB to further configure different TRPs and/or different carrier BWPs for initial access, or for connection re-establishment or connection recovery.

Figure 8:
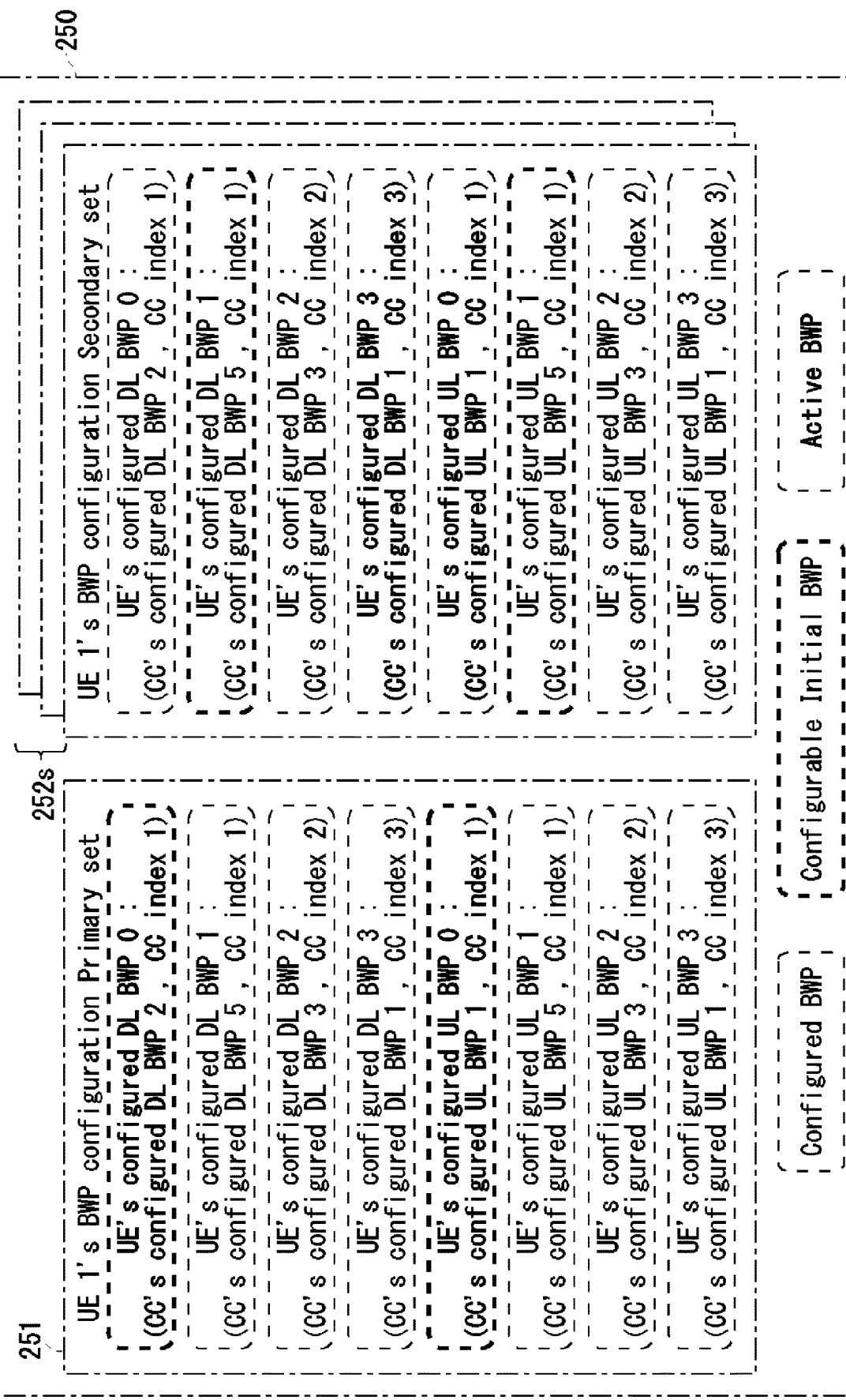
FIG. 8 is Exemplary BWP configuration set for realising BWP aggregation accordance with an embodiment of the disclosed invention.

According to the present embodiment, and referring to example 250—FIG. 8 for illustration, advanced UE equipped with more than one RF chains for CA can be configured with at most one primary set of configured BWPs (251) and one or multiple secondary sets of configured BWPs (252s) for realising BWP aggregation. Activating a secondary set of configured BWPs (252) or a configured BWP within the secondary set of configured BWPs shall enable BWP aggregation.

The scenarios on BWP configuration and operation on BWP switching or BWP aggregation for use at advanced UEs (50, 60, 70, and 80) in NR cell with multi-layers of CCs outlined in the wireless communication system 10—as per FIG. 3, are further detailed for individual UE basis through the examples illustrated in FIG. 9, FIG. 10, FIG. 11 and FIG. 12 as follows.

Figure 9:
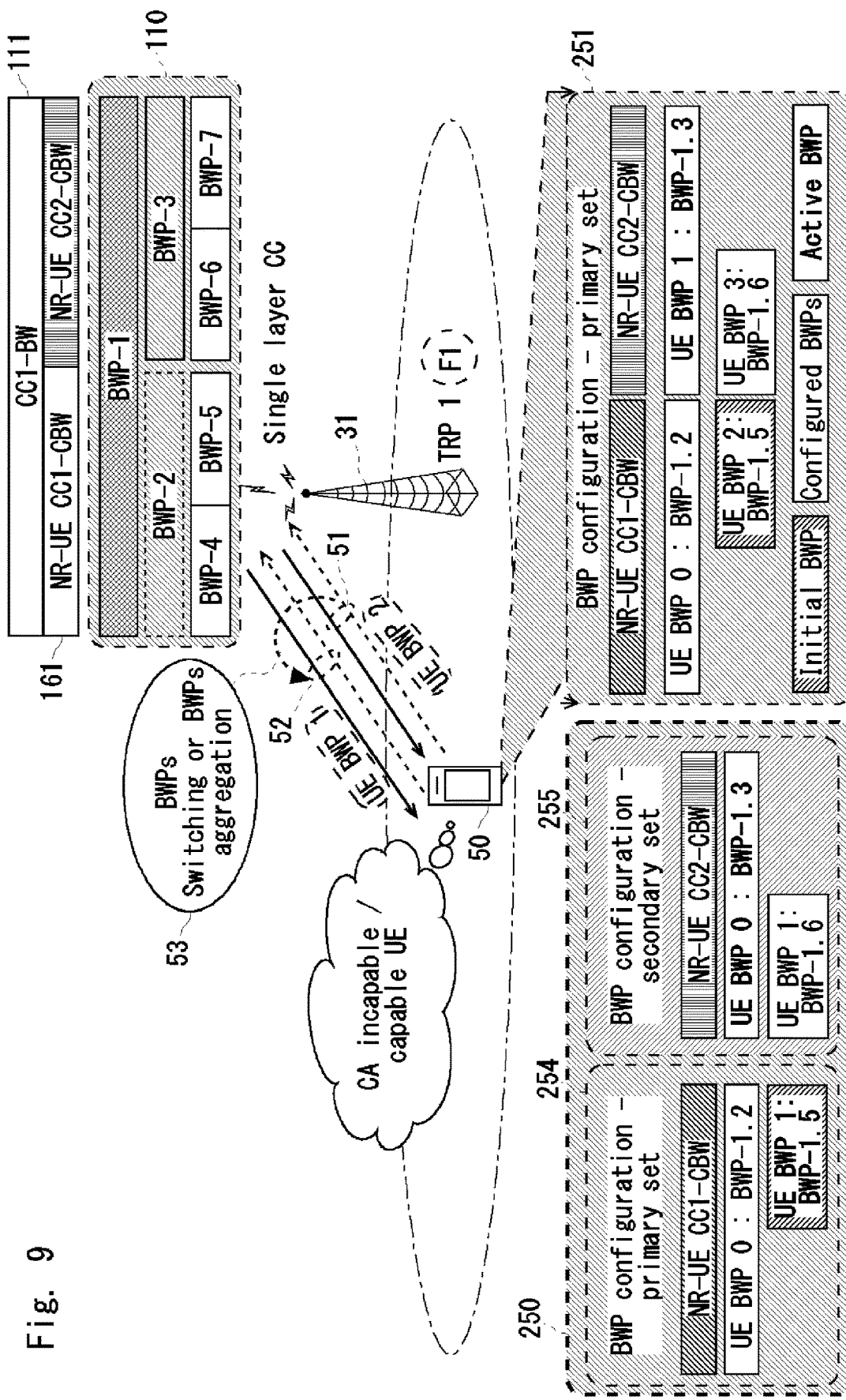
FIG. 9 is Exemplary BWP set configuration in realising BWP switching and BWP aggregation—single layer CC.

In reference to exemplary FIG. 9 for BWP switching and BWP aggregation within a Carrier BW, the UE (50) may be serviced by the gNB (20) via single TRP1 (31). The TRP (31) may be configured to operate on CC1 with carrier BW (111) which is wider than the UE (50) maximum channel BW (161). For the purpose of BWP operation, the TRP1 (31) may be configured to comprise 7 carrier BWPs indexed from 1 to 7 (110). For BWP switching operation, the UE (50) may be configured with set of BWPs (251) with indexes [0, 1, 2 and 3], where UE-BWP0 is CC1's BWP2 labelled as BWP-1.2; UE-BWP1 is CC1's BWP3 labelled as BWP-1.3; UE-BWP2 is CC1's BWP5 labelled as BWP-1.5 as UE's initial BWP; and UE-BWP3 is CC1's BWP6 labelled as BWP-1.6. In realising BW adaptation and enabling optimal UE's power usage, the UE (50) may be instructed to switch from UE-BWP2 (51) to UE-BWP1 (52) for high throughput data transmission/reception. In this case, the UE (50) is capable of CA, the UE (50) may be configured with the sets of BWPs (253) comprising the primary set (254) and a secondary set (255). Where the primary set (254) comprises UE-BWP0 as CC1's BWP2 and UE-BWP1 as CC1's BWP5, and the secondary set (255) comprises UE-BWP0 as CC1's BWP3 and UE-BWP1 as CC1's BWP6. Concurrently activating UE-BWP1 in the primary set and UE-BWP0 in the secondary set concurrently shall enabling BWP aggregation e.g. UE BWP 0 (i.e. BWP-1.3) and UE BWP 1 (i.e. BWP-1.5).

Figure 10:
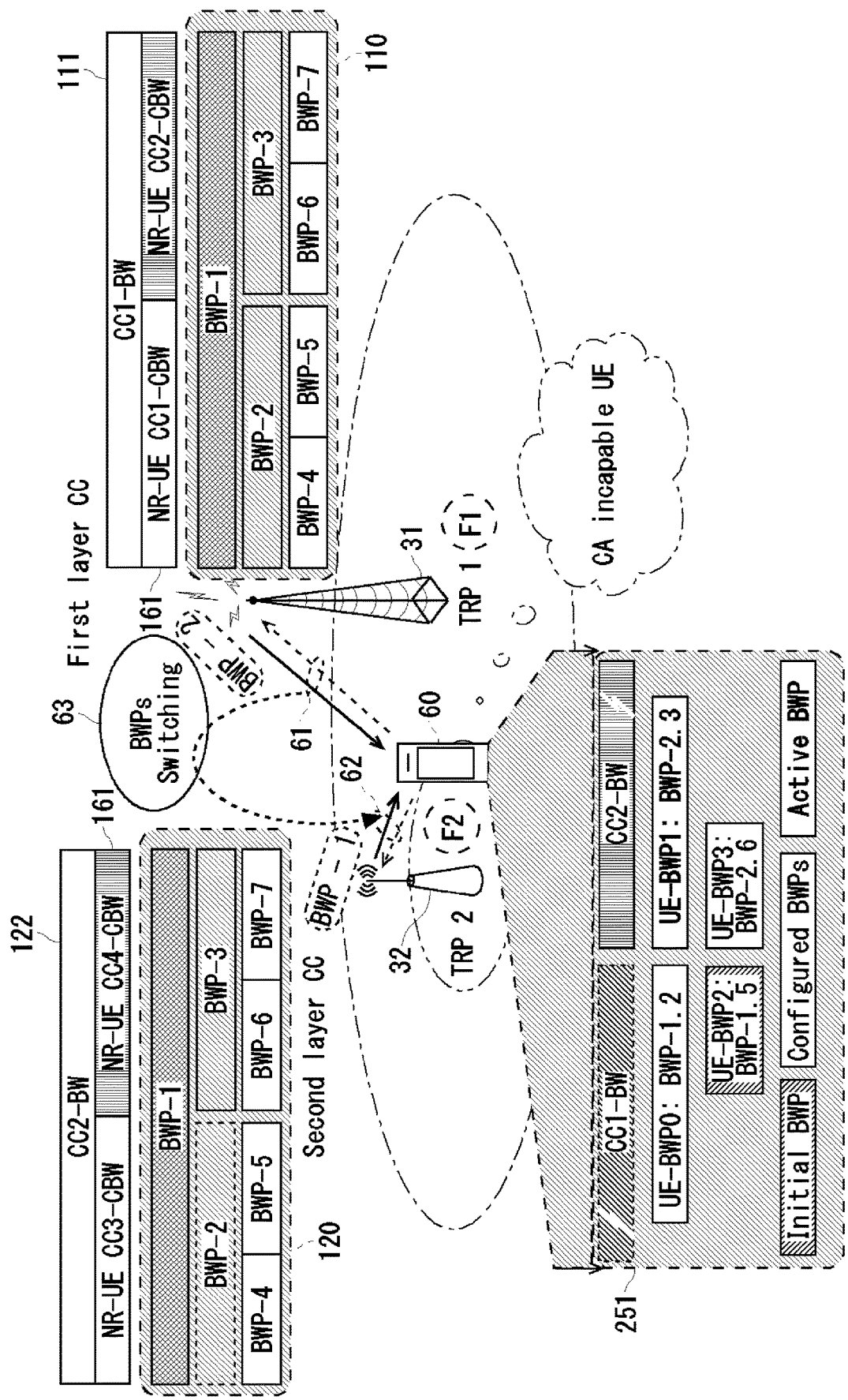
FIG. 10 is Exemplary BWP set configuration in realising BWP switching in multi-layer CCs cell system—2 layers CCs.

In reference to exemplary FIG. 10 for BWP switching across CCs, a UE (60) may be serviced by the gNB (20) via two non-collocated or differentiated TRP1 (31) and TRP2 (32). The UE (60) is said to be incapable of CA. The TRP (31) may be configured to operate on CC1 with carrier BW (111) and the TRP (32) may be configured to operate on CC2 with carrier BW (122), where CC1's BW and CC2's BW may be wider than the UE (60) maximum channel BW (161). For the purpose of BWP operation, the TRP1 (31) may be configured to comprise 7 carrier BWPs indexed from 1 to 7 (110), where the TRP2 (32) may also be configured to comprise 7 carrier BWPs indexed from 1 to 7 (120). For BWP switching operation across multiple CCs, the UE (60) may be configured with a set of BWPs (251) with indexes [0, 1, 2 and 3], where UE-BWP0 is CC1's BWP2 labelled as BWP-1.2; UE-BWP1 is CC2's BWP3 labelled as BWP-2.3; UE-BWP2 is CC1's BWP5 labelled as BWP-1.5 as UE's configured initial BWP; and UE-BWP3 is CC2's BWP6 labelled as BWP-2.6. In realising BW adaptation (63) where QoS will be optimised on the numerology and carrier frequency different from the numerology and carrier frequency on the configured initial BWP, the UE (60) may be instructed to switch from currently activated UE-BWP2 (61) served by TRP1 (31) to the next activated UE-BWP1 (62) served by TRP2 (32).

Figure 11:
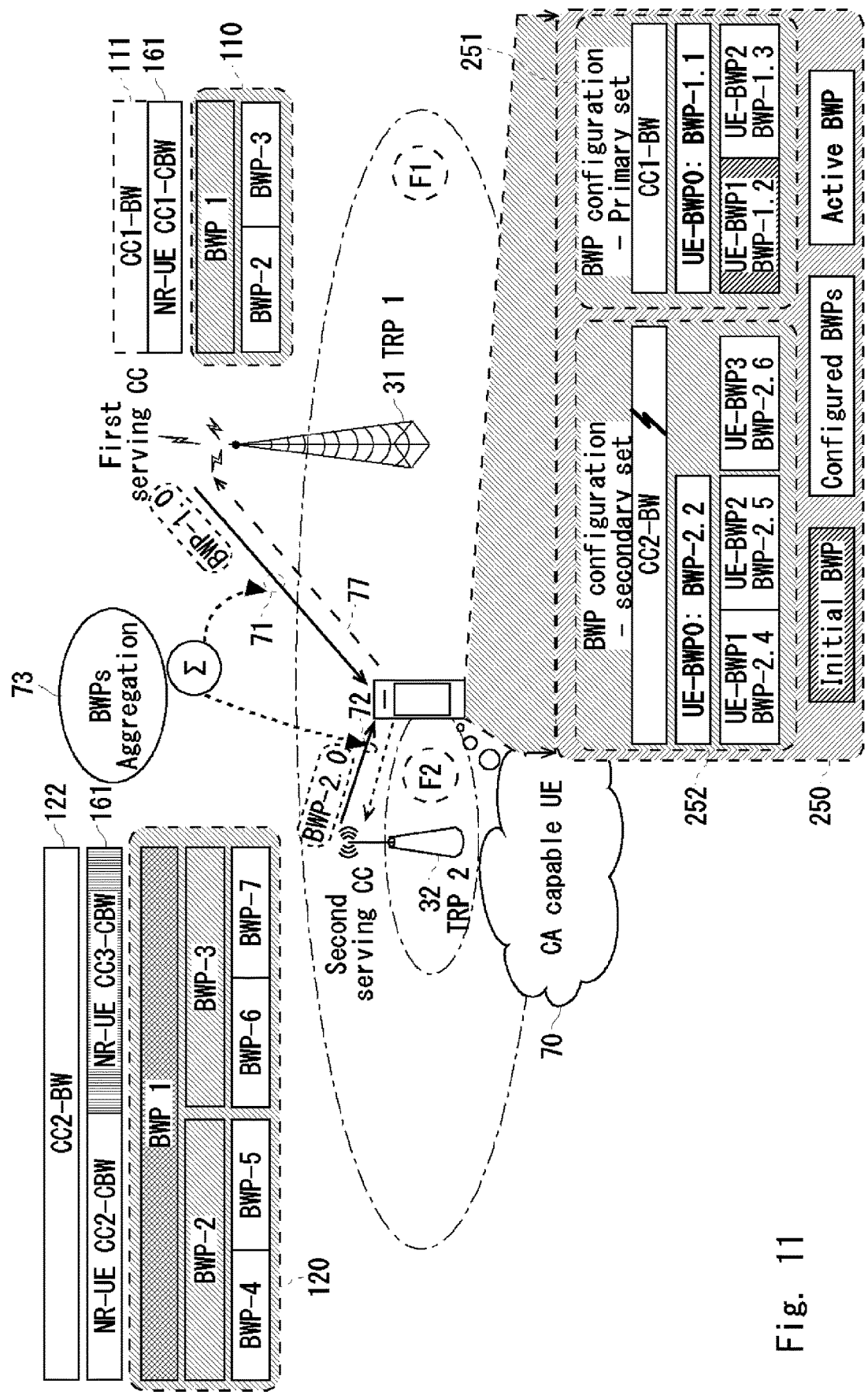
FIG. 11 is Exemplary BWP set configuration in realising BWP aggregation in multi-layer CCs cell system—2 layers CCs.

In reference to exemplary FIG. 11 for DL BWP aggregation across CCs, a UE (70) may be serviced by the gNB (20) via two non-collocated TRP1 (31) and TRP2 (32) concurrently. The UE (70) has a plurality of RF chains for CA. The TRP (31) may be configured to operate on CC1 with carrier BW (111) and the TRP (32) may be configured to operate on CC2 with carrier BW (122), where CC2's BW may be much wider than the UE (70) maximum channel BW (161). For the purpose of BWP operation, the TRP1 (31) may be configured to limitedly comprise 3 carrier BWPs indexed from 1 to 3 (110), where the TRP2 (32) may be configured to comprise 7 carrier BWPs indexed from 1 to 7 (120) on a wider carrier BW. For BWP aggregation operation across multiple CCs, the UE (70) may be configured with primary and secondary sets of BWPs (250). The primary set (251) has the configured BWPs with indexes [0, 1, and 2], where UE-BWP0 is CC1's BWP1 labelled as BWP-1.1; UE-BWP1 is CC2's BWP2 labelled as BWP-1.2; and UE-BWP2 is CC1's BWP3 labelled as BWP-1.3. The secondary set (252) has the configured BWPs with indexes [0, 1, 2, and 3], where UE-BWP0 is CC2's BWP2 labelled as BWP-2.2; UE-BWP1 is CC2's BWP4 labelled as BWP-2.4; UE-BWP2 is CC2's BWP5 labelled as BWP-2.5; and UE-BWP1 is CC2's BWP4 labelled as BWP-2.4; UE-BWP3 is CC2's BWP6 labelled as BWP-2.6. In realising BWP aggregation (73) where the UE (70) is concurrently serviced by both TRP1 (31) on DL UE-BWP-1.0 (71) and TRP2 (32) on DL UE-BWP-2.0 (72); and the configured UL BWP is linked with the primary BWP set for optimum UL signal transmission and reception (77). It should be noted that it is not restricted that a primary set of configured BWPs or a secondary set of configured BWPs comprising BWPs within one Carrier BW as shown in the example.

Figure 12:
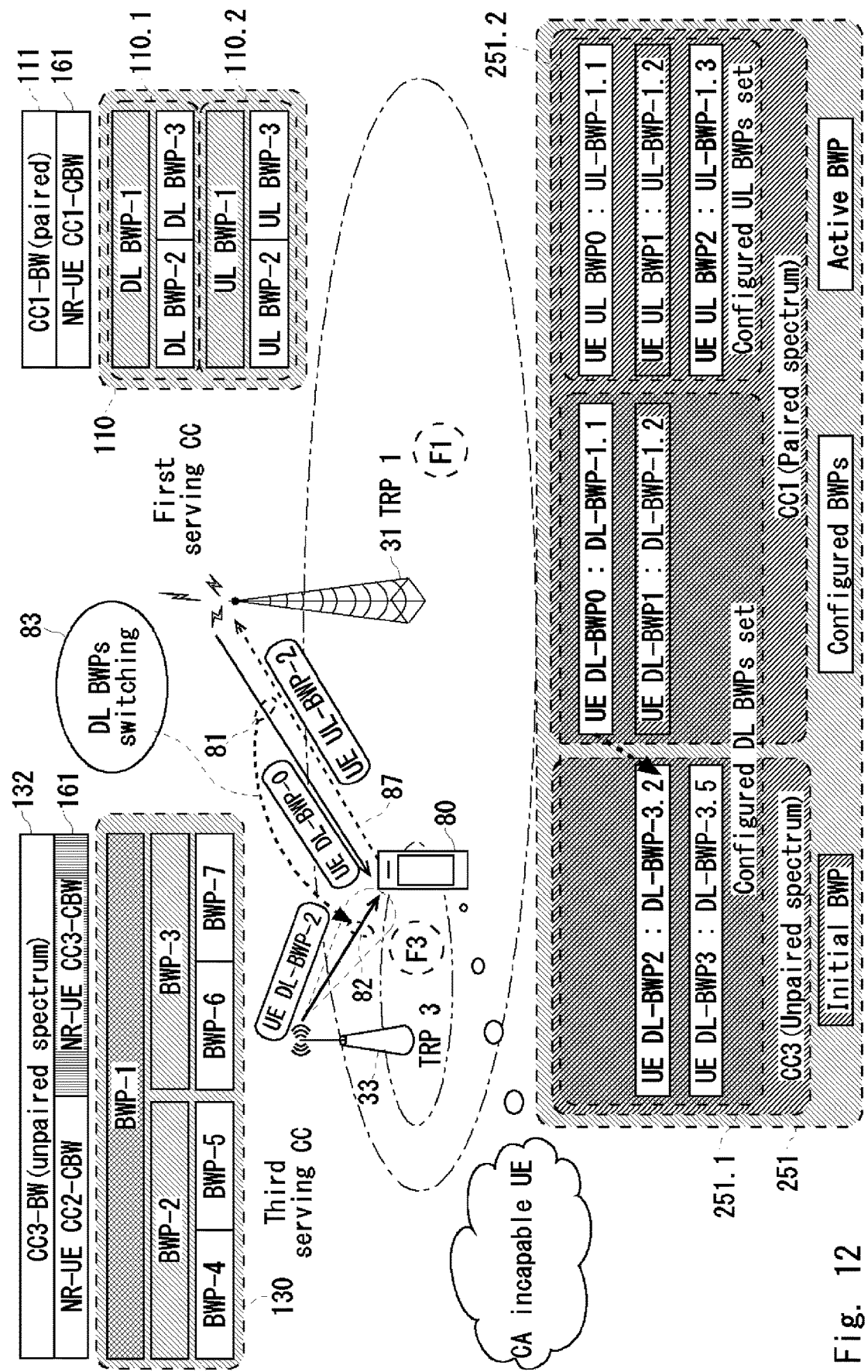
FIG. 12 is Exemplary BWP set configuration in realising BWP switching in multi-layer CCs cell system.

In reference to exemplary FIG. 12, there is illustrated a working scenario on DL BWP switching across two or more CCs for optimum beam-formed DL signal transmission and reception where UL BWP switching remaining on the same CC for optimal UL signal transmission and reception without the complexity of using UL beam-forming.

According to the present embodiment, the UE (80) may be serviced by the gNB (20) via two or more non-collocated TRPs (e.g. TRP1 (31) on paired spectrum and TRP3 (33) on unpaired spectrum) for DL signals transmission/reception, where adaptive DL beamforming on super wide bandwidth can be provided at the TRP3. For UL signal transmission/reception, the UE (80) may be serviced by the gNB (20) via single TRP1 (31). The UE (80) is FDD UE having single DL and UL RF chain and therefore is incapable of CA. The TRP1 (31) may be configured to operate on paired CC1 with carrier BW (111) and the TRP3 (33) may be configured to operate on unpaired CC3 with carrier BW (132), where CC3's BW may be much wider than the UE (70) maximum channel BW (161). For the purpose of BWP operation, the TRP1 (31) may be configured to limitedly comprise 3 carrier DL BWPs indexed from 1 to 3 (110.1) and 3 carrier UL BWPs indexed from 1 to 3 (110.2), where the TRP3 (33) may be configured to comprise 7 carrier BWPs indexed from 1 to 7 (130) on a wider carrier BW. For BWP switching operation across CC1 and CC3 utilising optimal adaptive beam-formed signal transmission from the TRP3, the UE (80) may be configured with set of DL BWPs (251.1) with indexes [0, 1, 2 and 3]. Where UE DL-BWP0 is CC1's DL BWP1 labelled as DL BWP-1.1; UE DL-BWP1 is CC1's DL BWP2 labelled as DL BWP-1.2; UE DL-BWP2 is CC3's DL BWP2 labelled as DL BWP-3.2; and UE-BWP3 is CC3's DL-BWP5 labelled as BWP-3.5. As the UE (80) is FDD UE, it is further configured with set of UL BWPs (251.2) with indexes [0, 1, and 2], where all configured UL-BWPs may be on CC1 (111) from TRP1 (33). In realising BW adaptation (63) where QoS will be optimised with adaptive beamforming on the numerology and carrier frequency served by TRP3, the UE (80) may be instructed to switch from non-beamforming signal on UE DL-BWP-0 (81) served by TRP1 (31) to beamforming signal on UE DL-BWP-2 (82) served by TRP3 (33). In eliminating, the complexity of UL beamforming, the UE (80) may be instructed to switch from the initial UE UL-BWP-1 on CC1 to UE UL-BWP-2 (87) on CC1 served by TRP1 (31) for UL signal transmission.

In a NR cell system comprising plurality of TRPs co-ordinately operating on multiple layers of CCs with BWPs configuration for BWP switching and/or BWPs aggregation as being described above, an advanced UE may be configured with a set of indexed BWPs where 2 or more indexed BWPs in the set may not reside within the UE maximum channel BW. According to the present embodiment, the advanced UE will be further configured with periodic measurement gaps for RRM/CSI measurement on any configured BWP that is outside the UE maximum channel BW, where the UE maximum channel BW is enclosing the current active BWP or the configured initial BWP. In a configured measurement gap, the advanced UE is required to retune the centre frequencies to one or more configured BWPs and to perform RRM/CSI measurement. Upon returning to its currently active BWP or initial BWP, the advanced UE is required to transmit the measurement reports to the servicing gNB preferably on the pre-scheduled UL channels, where the measurement report will assist the active BWP switching decision making at the servicing gNB.

Advantageously, foregoing embodiment enables inter carriers/frequency bandwidth/numerology adaptation and zero-latency inter carriers/frequencies handover.

The technique described in this document relates to a scalable NR cell structure, which comprises a logical node gNB and plurality of associated physical transmission/reception points (TRPs) forming a cloud radio interface across multi-layers of component carriers within one frequency band or across multiple frequency bands. Bandwidth part operation may be further facilitated for realising inter carriers/frequency bandwidth/numerology adaptation, and zero-latency inter carriers/frequency handover adaptively.

The foregoing method includes the following highlights:

Configuring the physical TRPs associated with a logical gNB to perform radio related functions for signals transmission and reception concurrently on multiple layers of carriers in frequency bands (e.g. ranging from UHF, to SHF and EHF) that forms the desired cloud radio interface of the NR cell;

Configuring the carriers' bandwidths of the NR cell to comprise one or multiple bandwidth parts (BWPs), where a carrier BW may be several time wider than a UE maximum channel BW, and a configured carrier BWP may be smaller or equal to a UE maximum channel BW;

For BWP switching operation, configuring a UE with a single set of indexed BWPs, where an indexed BWP is the carrier BWP and the BWPs of a configured set may be the carrier BWPs within one carrier BW or across several carriers' BWs. Furthermore, the BWPs of a configured set are indexed per UE basic according to the combination of carrier BWP index and the carrier index;

For BWP aggregation operation, configuring a UE with two or more sets of indexed BWPs comprising at most one primary set and one or multiple secondary set, where activating a configured secondary set or indexed BWP in a configured secondary set shall activate BWPs aggregation at a UE;

For BWP operation including BWP switching and BWP aggregation, a gNB may further configure its UE with a configurable 'initial BWP', where the gNB may use DCI or MAC-CE messages to reconfigure the 'initial BWP' at a UE i.e. indicate the BWP index that the UE should use as its 'initial BWP';

For BWP operation, where a UE has been configured with a set of indexed BWPs, the eNB may reconfigure the a set of indexed BWPs using action including removing an existing indexed BWP in a configured set, or adding new indexed BWP in a configured set, or replacing an existing indexed BWP with a new indexed BWP in a configured set;

For BWP operation, where a UE is configured with a set of indexed BWPs which comprises 2 or more indexed BWPs residing outside the UE's maximum channel BW, the gNB may configure the UE to have "periodic measurement gaps" for RRM/CSI measurement;

For FDD UE, gNB may configure the UE to have a set of indexed DL BWPs and a set of indexed UL BWPs. The configured set of indexed DL BWPs may comprise carrier BWPs across several carriers in the cell enabling the UE to utilise high frequency band with beamforming or optimum DL signal reception, where the configured set of indexed UL BWPs may comprise carrier BWPs with a carrier that is best for UL signal transmission/reception according to the UE's mobility without using complex UL beamforming procedure.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The whole or part of the exemplary embodiments disclosed above can be described as, but not limited to, the following supplementary notes.

(Supplementary Note 1)

A method for use in a scalable New Radio (NR) cell system, the system comprising a single gNB and multiple associated transmission and reception points (TRPs) defining an NR cell having cloud radio interface coverage on multiple layers of component carriers (CCs), the system further comprising a plurality of in-coverage advanced UEs together configured for bandwidth parts (BWPs) operation, the method comprising:

at the gNB, configuring a physical TRP in the NR cell as a high power gNB's distribution unit (DU) operating on a first CC layer;

at the gNB, configuring the remaining physical TRPs in the NR cell as low power gNB's DUs operating on one or multiple second CC layers;

at the gNB, further configuring the carrier bandwidths on the first CC layer and second CC layers to comprise multiple BWPs;

at the gNB, via high layer signaling, configuring one or more advanced UEs in services or requesting services with a set of indexed BWPs and a configurable "initial BWP" for active BWP switching operation; and at the gNB, via high layer signaling, configuring one or more advanced UEs in services or requesting services with two or more sets of indexed BWPs for active BWPs aggregation operation.

(Supplementary Note 2)

The method according to Supplementary Note 1, wherein the carrier BW on any configured CC layer can be several times larger than the maximum channel BW of one or several UEs in services or requesting services.

(Supplementary Note 3)

The method according to Supplementary Note 2, wherein the carrier BWs on all configured CC layers are configured to comprised non-overlapping and/or overlapping indexed carrier BWPs.

(Supplementary Note 4)

The method according to Supplementary Note 3, wherein the bandwidth of one or more configured carrier BWPs is/are equal or smaller than the maximum channel BW of one or several UEs in services or requesting services.

(Supplementary Note 5)

The method according to Supplementary Note 1, wherein a set of indexed BWPs, being configured for active BWPs switching or active BWPs aggregation at an advanced UE, can comprise indexed carrier BWPs from one CC layer or from across multiple CC layers within the defined NR cell.

(Supplementary Note 6)

The method according to Supplementary Note 5, wherein the BWPs in a configured set for active BWPs switching or active BWPs aggregation at an UE is indexed based on the combination of carrier BWP index and CC index.

(Supplementary Note 7)

The method according to Supplementary Note 1, wherein identical set of indexed BWPs can be configured for use at two or more UEs in the same NR cell.

(Supplementary Note 8)

The method according to Supplementary Note 7, wherein a plurality of advanced UEs, within an NR cell sharing an identical configured set of indexed BWPs, can be further configured by their servicing gNB with same or different configurable 'initial BWP'.

(Supplementary Note 9)

The method according to Supplementary Note 8, wherein a UE with activated BWP for DL/UL signal reception/transmission can be instructed by its servicing gNB to change the 'initial BWP' adaptively depending on the UE's mobility, UE's requested services and/or traffic load at or around UE's location.

(Supplementary Note 10)

The method according to Supplementary Note 9, wherein DCI or MAC CE messages can be used by a servicing gNB to instruct its serviced UE to change or reconfigure the 'initial BWP'.

(Supplementary Note 11)

The method according to Supplementary Note 1, wherein a set of indexed BWPs is configured for use at an UE comprising two or more configured BWPs that do not reside within the UE maximum channel BW, the gNB further configuring the UE to have a periodic measurement gap.

(Supplementary Note 12)

The method according to Supplementary Note 11, wherein in the configured measurement gap, a UE performs RRM/CSI measurement on the configured BWPs that are outside the UE maximum channel BW, the UE maximum channel BW enclosing the current activated BWP or the configured initial BWP.

(Supplementary Note 13)

The method according to Supplementary Note 12, wherein upon returning to the current activated BWP or the configured initial BWP after a periodic measurement gap, the UE is transmitting the measurement report in the pre-scheduled UL channels.

(Supplementary Note 14)

The method according to Supplementary Note 1, wherein a set of indexed BWPs being initially configured for use at an advanced UE can be reconfigured by the servicing gNB including removing existing configured carrier BWP from the current set, or adding new configured carrier BWP to the current set, or removing and adding a configured carrier BWP to the current set.

(Supplementary Note 15)

The method according to Supplementary Note 1, wherein a FDD UE with BWP operation capability and being configured with a set of DL/UL BWPs comprising DL/UL BWPs across multiple CCs, can be instructed to switch its current activated DL BWP in UHF band serviced by the first TRP, to other activated DL BWP(s) in SHF or EHF band serviced by second TRPs utilising beamforming and super wide BW for DL data transmission where the activated UL BWP remains in UHF band serviced by the first TRP to eliminate the complexity of using UL beamforming.

(Supplementary Note 16)

The method according to Supplementary Note 1, wherein the active BWPs switching operation is across the multiple layers of CCs thereby enabling about 0 ms handover latency.

(Supplementary Note 17)

A scalable New Radio (NR) cell system, the system comprising a single gNB and multiple associated transmission and reception points (TRPs) defining an NR cell having cloud radio interface coverage on multiple layers of component carriers (CCs), the system further comprising a plurality of in-coverage advanced UEs together configured for bandwidth parts (BWPs) operation, the gNB:

configuring a physical TRP in the NR cell as a high power gNB's distribution unit (DU) operating on a first CC layer;

configuring the remaining physical TRPs in the NR cell as low power gNB's DUs operating on one or multiple second CC layers;

further configuring the carrier bandwidths on the first CC layer and second CC layers to comprise multiple BWPs;

via high layer signaling, configuring one or more advanced UEs in services or requesting services with a set of indexed BWPs and a configurable "initial BWP" for active BWP switching operation; and via high layer signaling, configuring one or more advanced UEs in services or requesting services with two or more sets of indexed BWPs for active BWPs aggregation operation.

The invention claimed is:

1. A method for use in a gNB of a scalable New Radio (NR) cell system, the system comprising the gNB and multiple associated transmission and reception points (TRPs) defining an NR cell having cloud radio interface coverage on multiple layers of component carriers (CCs), the system further comprising a plurality of in-coverage advanced UEs together configured for bandwidth parts (BWPs) operation, the method comprising:

configuring a physical TRP in the NR cell as a high power gNB's distribution unit (DU) operating on a first CC layer;

configuring the remaining physical TRPs in the NR cell as low power gNB's DUs operating on one or multiple second CC layers;

further configuring the carrier bandwidths on the first CC layer and second CC layers to comprise multiple BWPs;

configuring, via high layer signaling, one or more advanced UEs in services or requesting services with a set of indexed BWPs and a configurable "initial BWP" for active BWP switching operation; and configuring, via high layer signaling, one or more advanced UEs in services or requesting services with two or more sets of indexed BWPs for active BWPs aggregation operation.

2. The method according to claim 1, wherein the carrier BW on any configured CC layer is several times larger than the maximum channel BW of one or several UEs in services or requesting services.

3. The method according to claim 2, wherein the carrier BWs on all configured CC layers are configured to comprised non-overlapping and/or overlapping indexed carrier BWPs.

4. The method according to claim 3, wherein the bandwidth of one or more configured carrier BWPs is/are equal or smaller than the maximum channel BW of one or several UEs in services or requesting services.

5. The method according to claim 1, wherein a set of indexed BWPs, being configured for active BWPs switching or active BWPs aggregation at an advanced UE, comprises indexed carrier BWPs from one CC layer or from across multiple CC layers within the defined NR cell.

6. The method according to claim 5, wherein the BWPs in a configured set for active BWPs switching or active BWPs aggregation at an UE is indexed based on the combination of carrier BWP index and CC index.

7. The method according to claim 1, wherein identical set of indexed BWPs can be configured for use at two or more UEs in the same NR cell.

8. The method according to claim 7, wherein a plurality of advanced UEs, within an NR cell sharing an identical configured set of indexed BWPs, can be further configured by their servicing gNB with same or different configurable 'initial BWP'.

9. The method according to claim 8, wherein a UE with activated BWP for DL/UL signal reception/transmission can be instructed by its servicing gNB to change the 'initial BWP' adaptively depending on the UE's mobility, UE's requested services and/or traffic load at or around UE's location.

10. The method according to claim 9, wherein DCI or MAC CE messages are used by a servicing gNB to instruct its serviced UE to change or reconfigure the 'initial BWP'.

11. The method according to claim 1, wherein a set of indexed BWPs is configured for use at an UE comprising two or more configured BWPs that do not reside within the UE maximum channel BW, the gNB further configuring the UE to have a periodic measurement gap.

12. The method according to claim 11, wherein in the configured measurement gap, a UE performs RRM/CSI measurement on the configured BWPs that are outside the UE maximum channel BW, the UE maximum channel BW enclosing the current activated BWP or the configured initial BWP.

13. The method according to claim 12, wherein upon returning to the current activated BWP or the configured initial BWP after a periodic measurement gap, the UE is transmitting the measurement report in the pre-scheduled UL channels.

14. The method according to claim 1, wherein a set of indexed BWPs being initially configured for use at an advanced UE can be reconfigured by the servicing gNB including removing existing configured carrier BWP from the current set, or adding new configured carrier BWP to the current set, or removing and adding a configured carrier BWP to the current set.

15. The method according to claim 1, wherein a FDD UE with BWP operation capability and being configured with a set of DL/UL BWPs comprising DL/UL BWPs across multiple CCs, can be instructed to switch its current activated DL BWP in UHF band serviced by the first TRP, to other activated DL BWP(s) in SHF or EHF band serviced by second TRPs utilising beamforming and super wide BW for DL data transmission where the activated UL BWP remains in UHF band serviced by the first TRP to eliminate the complexity of using UL beamforming.

16. The method according to claim 1, wherein the active BWPs switching operation is across the multiple layers of CCs thereby enabling about 0ms handover latency.

17. A gNB of a scalable New Radio (NR) cell system, the system comprising the gNB and multiple associated transmission and reception points (TRPs) defining an NR cell having cloud radio interface coverage on multiple layers of component carriers (CCs), the system further comprising a plurality of in-coverage advanced UEs together configured for bandwidth parts (BWPs) operation, the gNB configured to:
  configure a physical TRP in the NR cell as a high power gNB's distribution unit (DU) operating on a first CC layer;
  configure the remaining physical TRPs in the NR cell as low power gNB's DUs operating on one or multiple second CC layers;
  further configure the carrier bandwidths on the first CC layer and second CC layers to comprise multiple BWPs;
  configure, via high layer signaling, one or more advanced UEs in services or requesting services with a set of indexed BWPs and a configurable "initial BWP" for active BWP switching operation; and
  configure, via high layer signaling, one or more advanced UEs in services or requesting services with two or more sets of indexed BWPs for active BWPs aggregation operation.

* * * * *